Oct. 9, 1962   D. L. STODDARD   3,057,210
HIGH SPEED MECHANICAL POSITIONING MECHANISM
Filed Dec. 19, 1961

INVENTOR.
DAVID L. STODDARD
BY Robert B Crouch

United States Patent Office 3,057,210
Patented Oct. 9, 1962

3,057,210
HIGH SPEED MECHANICAL POSITIONING MECHANISM
David L. Stoddard, San Jose, Calif., assignor to International Business Machines Corporation, New York, N.Y., a corporation of New York
Filed Dec. 19, 1961, Ser. No. 160,577
10 Claims. (Cl. 74—1)

The present invention relates to a mechanical positioning mechanism and more particularly to a high speed mechanical actuator for selectively positioning an object over a predetermined range of positions.

The present invention provides a mechanical positioning mechanism in the form of a numerical adder in which a plurality of cam blocks are mounted adjacent one another on a rotating shaft for sliding motion axially thereof. One of the adjacent faces of each pair of the blocks is contoured to form a cam surface. The heights of the cam surfaces vary in a progression according to a desired numerical code. A plurality of shims, the thicknesses of which vary in a similar progression, are mounted adjacent the actuator shaft in alignment with the cam surfaces. Means is provided for selectively inserting the shims between adjacent cam blocks to ride on the cam surfaces and effect axially movement of a block or blocks along the shaft. A linear output from the mechanism is provided which is equal to the sum of the displacements of the individual cam blocks.

The object of the present invention is to provide a compact, mechanical positioning mechanism for positioning an object in small increments within a predetermined range of positions, at high speed and with a high degree of accuracy.

The foregoing and other objects, features and advantages of the invention will be apparent from the following more particular description of a preferred embodiment of the invention, as illustrated in the accompanying drawings.

Figure 1:
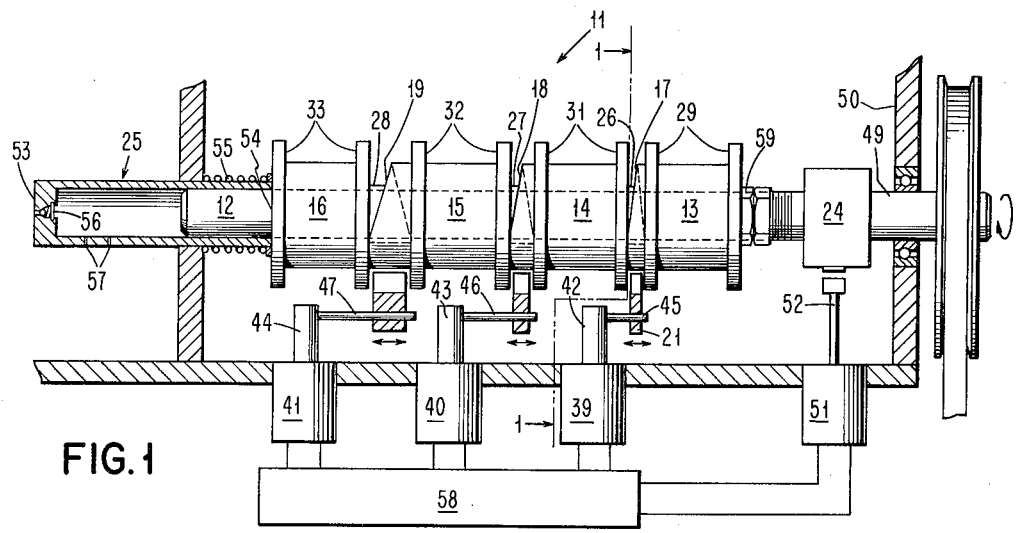
FIG. 1 is an elevation view, partly in section, of the positioning device of the present invention with the shims disengaged from the cam surfaces.

Referring to FIG. 1 of the drawing, the positioning mechanism 11 of the present invention include a shaft 12 which carries a plurality of cam blocks 13–15 and a follower block 16. The cam block 13–15 are each provided with a cam surface 17–19 which abuts an opposing face of the next adjacent block. Shims 21–23 are pivotally mounted adjacent the shaft 12, each shim being aligned with a cam surface. A single revolution clutch 24 is connected to one end of the shaft 12 and an actuator output member 25 is mounted on the opposite end of the shaft.

Figure 2:
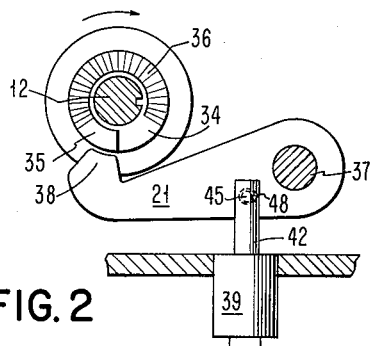
FIG. 2 is an elevation view taken along line 1—1 of FIG. 1.
Figure 3:
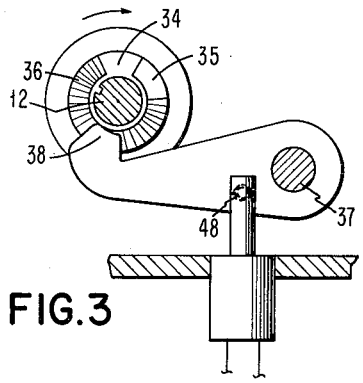
FIG. 3 is an elevation similar to FIG. 2 showing the shim inserted part way between the cam blocks.
Figure 4:
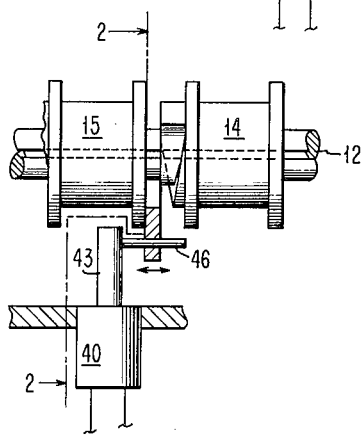
FIG. 4 is a fragmentary view of a portion of the device of FIG. 1 showing the shim fully inserted between the cam blocks.
Figure 5:
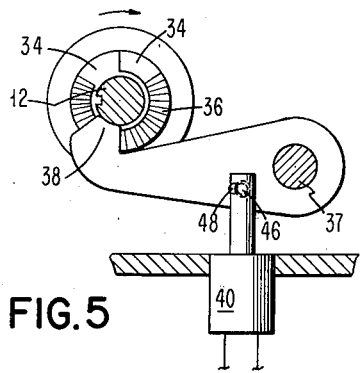
FIG. 5 is an elevation view taken along line 2—2 of FIG. 4.

Each of the cam blocks is affixed to an internal sleeve 26–28 which is keyed or otherwise secured to the shaft 12 for uni-directional movement axially thereof. Follower block 16 may be secured to shaft 12 as illustrated, or loosely mounted thereon as desired. The blocks are all spool-shaped, the end portions thereof protruding radially to form cylindrical shoulders 29, 31, 32 and 33. As indicated in FIGS. 2, 3 and 5 each of the cam surfaces is provided with a low dwell portion 34 and a high dwell portion 35 which are connected in the direction of rotation of the shaft by an evenly inclined ramp section 36. As shown in FIG. 1, the rise of each cam surface (i.e., the height of the upper dwell above the lower dwell) is selected in accordance with a predetermined numerical sequence. Shims 21–23, as indicated in FIGS. 2, 3, and 5 are loosely mounted on a shaft 37 which is essentially parallel to shaft 12. The shims extend outwardly away from shaft 37 toward the cam blocks and the distal end of each shim is upturned to form a wedge section 38 (FIG. 2). The widths of the various shim wedges are selected in accordance with a predetermined numerical sequence similar to the rises of the cam surfaces, the actual width of each wedge being slightly less than the rise of the corresponding cam surface. Actuators, such as solenoids 39, 40, 41, are mounted adjacent each of the shims. Armatures 42, 43 and 44 of the solenoids are each connected to one of the shims, such as by pins 45–47. The pins each extend generally normal to the associated armature and pass through slotted openings 48 (FIG. 2) in the shims.

A constantly running shaft 49 is journalled in frame 50 and is connected to the clutch 24. A clutch solenoid 51 is mounted adjacent solenoids 39, 40 and 41 with its armature 52 extending into proximity with the clutch 24. The actuator output member 25 is in the form of a cylinder having a closed end 53 and an open end 54 telescoped over the end of shaft 12 removed from clutch 24. The open end 54 of the actuator output cylinder bears against and follows the exterior flat face of follower block 16. The open end 54 may be either secured to block 16 or biased against it by means of compression spring 55. A ball check valve 56 is provided in the closed end 53 of the actuator output and bleed orifices 57 are spaced slightly from the closed end. A positioning controller 58 is operatively connected to each of the solenoids 39, 40, 41 and 51. A section of shaft 12 between cam blocks 13 and the clutch 24 is externally threaded and a locknut 59 is mounted thereon in abutting relation with cam block 13. The lock nut 59 positions cam block 13 on the shaft 12 and provides an adjustable zero reference for the positioning mechanism.

When the present positioning mechanism is at rest, as shown in FIG. 1, each shim wedge faces the high point or upper dwell of its respective cam surface, as shown in FIG. 2, and cannot enter the space between the adjacent cam blocks. To initiate the operation of the present device and effect movement of the actuator output, the clutch solenoid 51 and the desired shim solenoids are energized through controller 58. Clutch 24 then couples shaft 12 to constantly running shaft 49 for a single revolution. As shaft 12 and the attached cam blocks rotate, the desired shim wedges are forced upwardly by the solenoids into the openings between the blocks as soon as they face the lower dwells of the respective cam surfaces. The shim wedges, as shown in FIG. 3, then extend inwardly between the blocks into contact with the cam block sleeves. Continued rotation of the shaft 12 forces the blocks apart as the shim wedges ride up the ramp portions of the respective cam surfaces. When the shim wedges reach the upper dwells of the cam surfaces the blocks have been forced apart a distance equal to the thickness of the selected shim wedges. At the same time, since the end of each sleeve lies in the same transverse plane as the upper dwell of the associated cam surface, the shim wedges move inwardly between the edges of the sleeves to bear against the shaft 12, as shown in FIG. 5. Movement is transmitted through the array of blocks (from right to left as shown) to the actuator output member 25 which follows block 16. The actuator output member moves to the left on shaft 12 a distance equal to the sum of the individual movements of the blocks. During this movement fluid is admitted to the expanding space in the interior of the actuator output member through the check valve 56. The cycle of the mechanism ends with the shim wedges either on or opposite the upper dwell of the associated cam surface, depending upon whether the particular shim was actuated during that cycle. The load, which is attached to the actuator output member, remains in its new position until the positioning mechanism is recycled. To position the output member and the load to a new setting, either zero or another finite location, requires another cycle of the positioning mechanism. If it is desired to reposition the actuator to zero, solenoid 51 is energized to rotate shaft 12, the shim solenoids are deenergized and the wedges are withdrawn. The blocks are then forced together through the action of spring 55 and the actuator output member moves to the right along with the load. During this direction of movement of the output member, check valve 56 closes and the fluid trapped within the output member is exhausted through the bleed orifices, thus creating a dash pot effect to damp movement of the output member and prevent impact in the positioning mechanism.

If it is not desired to reposition the mechanism to zero, but it is instead desired to move it to some other position, at least some of the shim wedges may be left in position instead of being withdrawn. Assume for the sake of example, that the cam surfaces and shim wedges are coded according to a binary code, i.e., 1, 2, 4, and that it is desired to first position the load three increments to the left and then at the fifth increment to the left. In this example, shim solenoids 39 and 40 and clutch solenoid 51 would be energized. Shim wedges on shims 21 and 22 would be pivoted upwardly onto cam surfaces 17 and 18. At the end of the first cycle output member 25 would be extended a total of three increments, i.e., one plus two. To extend the output member to the fifth increment, clutch solenoid 51 and shim solenoid 41 would be energized, shim solenoid 39 would remain energized and shim solenoid 40 would be deenergized. Shim 23 would be extended and shim 22 would be withdrawn while the wedge of shim 21 would remain against shaft 12 between sleeves 26 and 27. Blocks 15 and 16 would move to the right when shim 22 is withdrawn. The shim wedge on shim 23 would be pivoted upwardly onto cam surface 19 and continued rotation of the shaft 12 would force block 16 and the actuator output member 25 to the left to position the load at the fifth (one plus four) increment position. The effect of these two cycles is, starting with zero and in sequence: add three, subtract two, and add four. To reposition the mechanism to zero the next step would be to subtract five by recycling the mechanism and withdrawing shims 21 and 23.

The present invention has the advantage of providing very accurate increments of movement since the wedges on the shims are flat and can be lapped to very close tolerances with relative ease. In this connection the accuracy of the shim wedges is critical while the accuracy of the cam surfaces is not.

The shoulders 29, 31, 32 and 33 overlie the edges of the shim wedges when the shims are withdrawn, as illustrated in FIG. 2. The shims are thus captured between the shoulders and are carried along shaft 37 and their respective pins in alignment with the cam surfaces as the blocks move axially of shaft 12. The shims and cam surfaces have been illustrated in a sequence of 1, 2, 4 from left to right for the purposes of explanation. However, in practice the sequence would generally be reversed with the most often used elements nearest the output member to reduce wear. In this connection, as wear occurs on the cam surfaces the position of the cam blocks on the shaft 12 can be adjusted by means of the locknut 59 or an equivalent structure.

In the positioning mechanism illustrated follower block 16 can be omitted if space limitations necessitate. In such case, a radially extending shoulder, similar to 33, would be provided on the output member 25 at its open end 54, so that the output member itself would follow either the adjacent cam surface or its cooperating shim.

While the invention has been particularly shown and described with reference to a preferred embodiment thereof, it will be understood by those skilled in the art that the foregoing and other changes in the form and details may be made therein without departing from the spirit and scope of the invention.

What I claim is:

1. A high speed mechanical positioning mechanism comprising:
    a shaft mounted for rotational movement;
    means for rotating the shaft;
    a series of individually movable elements, including a plurality of cam blocks and an output member, mounted on the shaft in abutting relation for movement axially thereof;
    a cam surface formed on each cam block and extending toward the adjacent element;
    a plurality of shims mounted adjacent the shaft, each shim being aligned with a cam surface; and
    means for selectively extending the shims between adjacent elements to ride on the cam surfaces and effect axial movement of the elements on the shaft.

2. A high speed mechanical positioning mechanism as defined in claim 1 in which the widths of the shims are varied in a progression according to a predetermined numerical code.

3. A high speed mechanical positioning mechanism as defined in claim 1 in which the widths of the shims and the heights of the cam surfaces are both varied in similar progressions according to a predetermined numerical code.

4. A high speed mechanical positioning mechanism comprising:
    a shaft supported for rotational movement;
    means including a single revolution clutch for rotating the shaft;
    a series of individually movable elements, including a plurality of cam blocks and an output member, mounted on a shaft in abutting relation for movement axially thereof;
    a cam surface formed on each cam block and extending axially of the shaft toward the adjacent element, the cam surfaces forming the points of contact between adjacent elements;
    a plurality of shims pivotally mounted adjacent the shaft, each shim being aligned with a cam surface; and
    means for selectively extending the shims between adjacent elements to ride on the cam surfaces during rotation of the shaft and effect axial movement of the elements on the shaft.

5. A high speed mechanical positioning mechanism as defined in claim 4 in which the widths of the shims are varied in a progression according to a predetermined numerical code.

6. A high speed mechanical positioning mechanism as defined in claim 4 in which the widths of the shims and the heights of the cam surfaces are both varied in similar progressions according to a predetermined numerical code.

7. A high speed mechanical positioning mechanism comprising:
    a shaft mounted for rotational movement about its longitudinal axis;
    means including a single revolution clutch for rotating the shaft;
    a series of individually movable elements, including a plurality of cam blocks and an output member, mounted on the shaft in abutting relation for movement axially thereof, each element having a shoulder extending radially therefrom adjacent each abutting element;
    a cam surface formed on each cam block and extending axially of the shaft between the shoulders of adjacent elements, the cam surfaces forming the points of contact between adjacent elements;

a plurality of shims mounted adjacent the cam blocks, each shim being aligned with a cam surface, a portion of each shim being received between the shoulders of adjacent elements; and means for selectively extending the shims between adjacent elements to ride on the cam surfaces during rotation of the shaft and effect axial movement of the elements on the shaft.

8. A high speed mechanical positioning mechanism as defined in claim 7 in which the widths of the shims are varied in a progression according to a predetermined numerical code.

9. A high speed mechanical positioning mechanism comprising:

a shaft supported for rotational movement;

means for rotating the shaft;

a series of individually movable elements mounted on the shaft in abutting relation for movement axially thereof, the elements including an output member adapted to be connected to a load;

a plurality of shims mounted adjacent the elements, each shim being aligned with the abutting surfaces of adjacent elements; and means for selectively extending the shims between adjacent elements to effect axial movement of the elements on the shaft to position the load.

10. A high speed mechanical positioning mechanism as defined in claim 9 wherein the widths of the shims are varied in a progression according to a predetermined numerical code.

References Cited in the file of this patent
UNITED STATES PATENTS

| | | |
|---|---|---|
| 2,077,962 | Smith | Apr. 20, 1937 |
| 2,999,392 | Rogers | Sept. 12, 1961 |